Jan. 27, 1959  J. L. DE LA PARRA CLARK  2,870,851
PARKING DEVICE FOR AUTOMOBILES
Filed Feb. 23, 1956  6 Sheets-Sheet 1
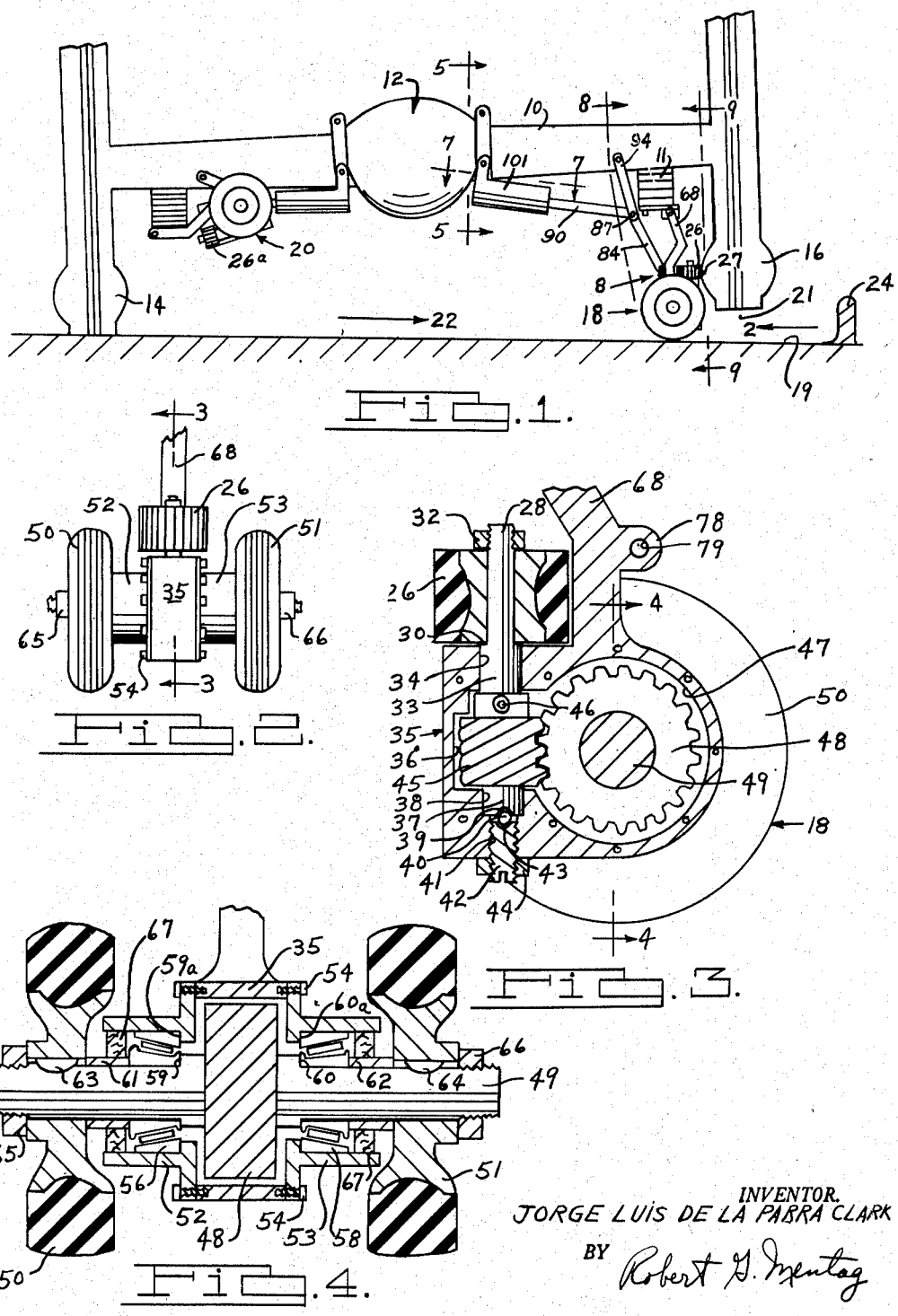
INVENTOR.
JORGE LUIS DE LA PARRA CLARK
BY Robert G. Mentag
ATTORNEY

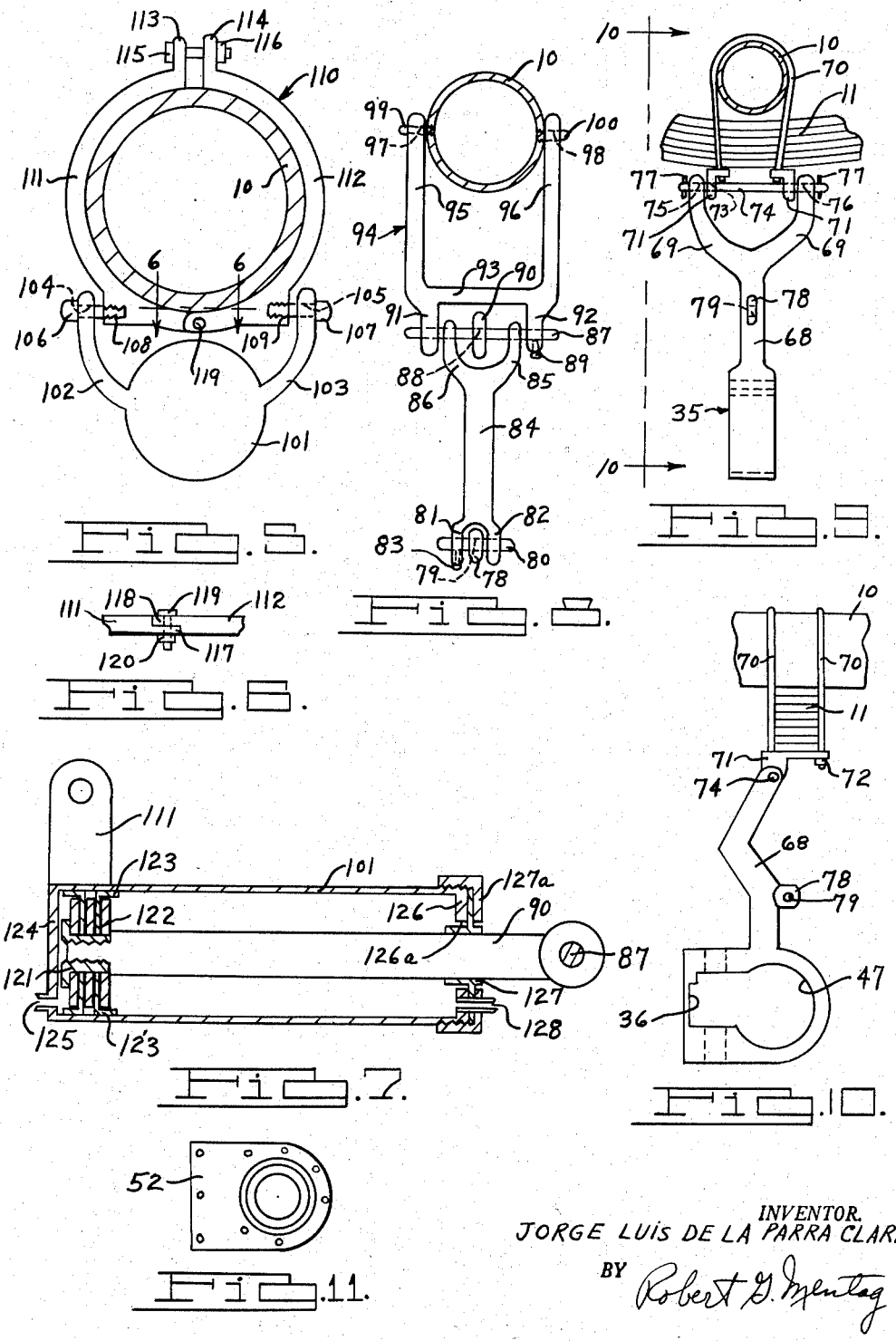

Jan. 27, 1959   J. L. DE LA PARRA CLARK   2,870,851
PARKING DEVICE FOR AUTOMOBILES
Filed Feb. 23, 1956   6 Sheets-Sheet 3
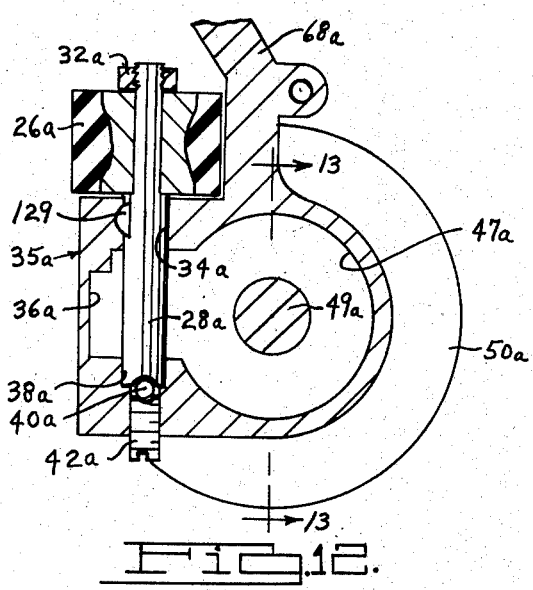
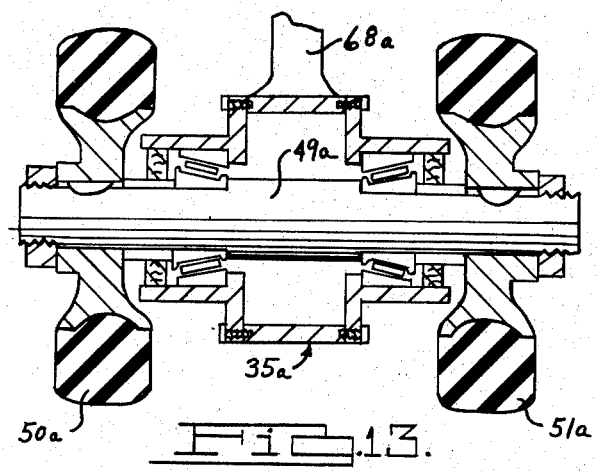
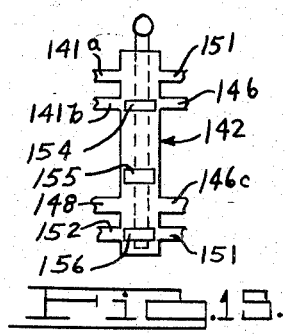
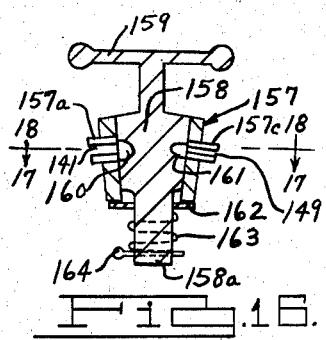
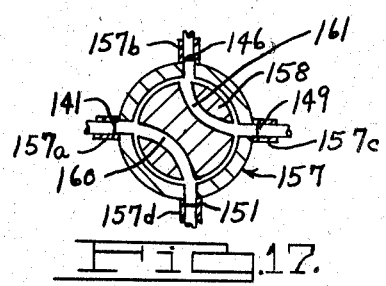
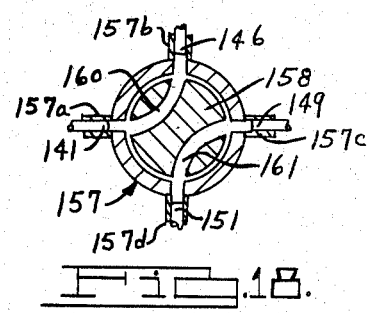
INVENTOR.
JORGE LUIS DE LA PARRA CLARK
BY Robert G. Mentag
ATTORNEY

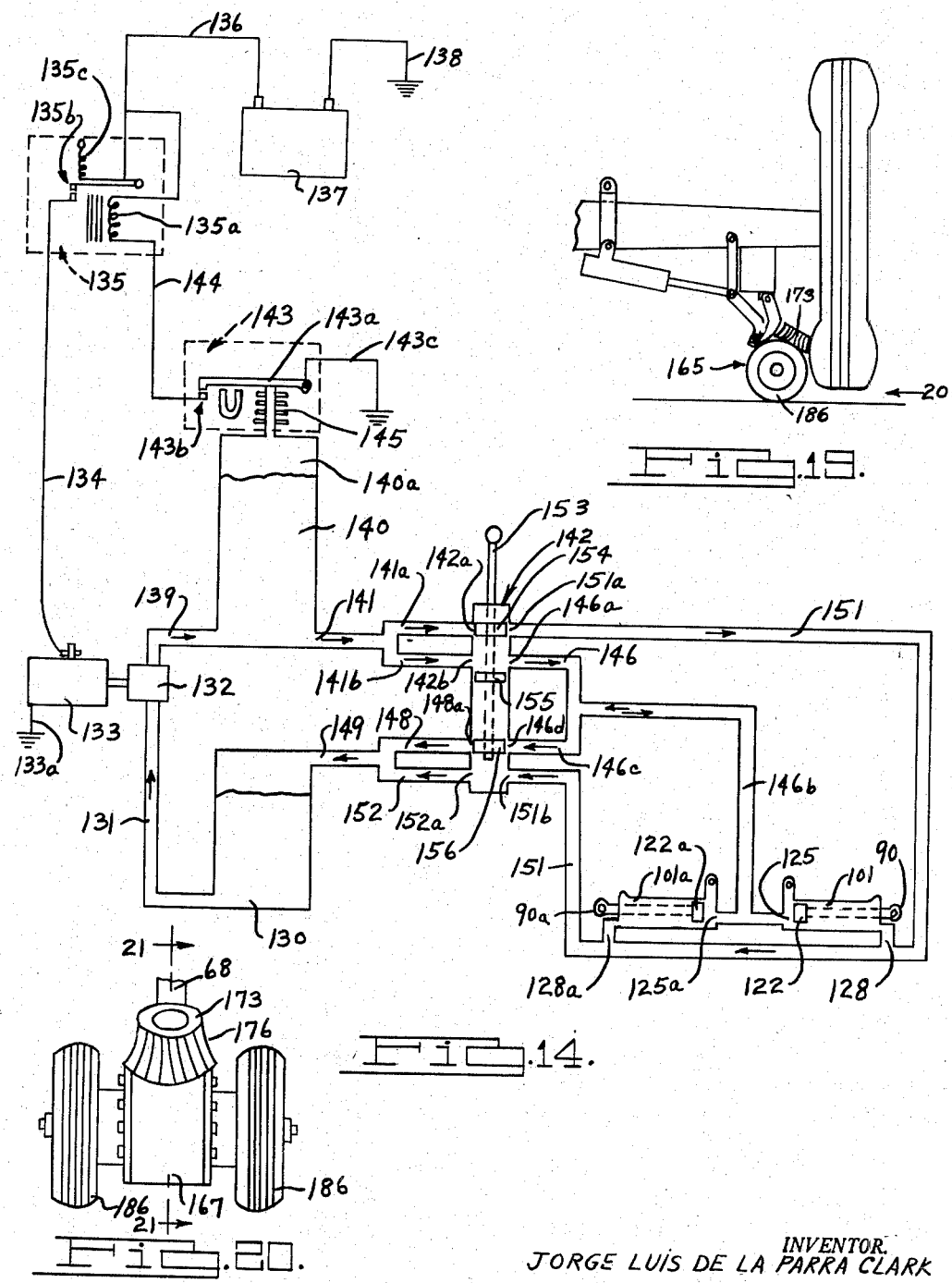

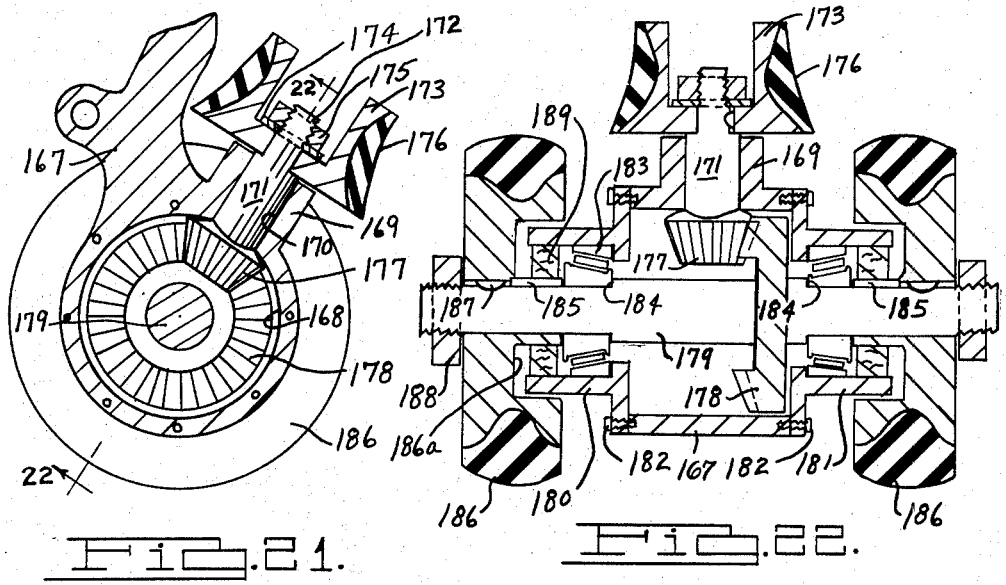

Jan. 27, 1959

J. L. DE LA PARRA CLARK 2,870,851

PARKING DEVICE FOR AUTOMOBILES

Filed Feb. 23, 1956

INVENTOR.
JORGE LUIS DE LA PARRA CLARK

BY Robert D. Mentag

ATTORNEY

United States Patent Office

2,870,851
Patented Jan. 27, 1959

2,870,851

PARKING DEVICE FOR AUTOMOBILES

Jorge Luis de la Parra Clark, Detroit, Mich., assignor of one-fourth to Robert G. Mentag, Detroit, Mich.

Application February 23, 1956, Serial No. 567,166

2 Claims. (Cl. 180—1)

This invention relates to a vehicle power parking device especially adapted for use on automotive vehicles of all types.

It is a primary object of this invention to provide a vehicle power parking device which is capable of being easily and quickly mounted in any new or used vehicle and which will permit the operator of the vehicle equipped with such a device to park the vehicle in a shorter parking space than was heretofor possible without such device.

It is another object of this invention to provide a vehicle power parking device which may be attached to the rear axle of the vehicle and which is retractible, when not in use, to a position adjacent the rear axle, yet which may be moved, by a fluid motor, into an operative position against the tires of the rear wheels of the vehicle and into driving and elevating engagement therewith, whereby the rear wheels are lifted off of the ground and, when power is applied to the rear wheels of the vehicle, one of the rear wheels will drive the parking device and the rear end of the vehicle will move side-wise into a parking area to complete an easy parking operation.

It is a further object of this invention to provide a vehicle power parking device which is adapted to permit the operator of a vehicle to park in a parallel parking space by merely nosing the forward end of the vehicle into a parking space and then moving the readward end of the vehicle side-wise into the parking space by means of the instant parking device.

It is a still further object of this invention to provide a vehicle power parking device of this class which will be simple of structure, economical of manufacture, durable and compact, and highly efficient in use.

Other objects, features, and advantages of this invention will be apparent from the following detailed description and appended claims, reference being had to the accompanying drawings forming a part of the specification wherein like reference numerals designate corresponding parts of the several views.

In the drawings:

Fig. 1 is a partial rear end elevational view of the drive wheels, axle and differential of a vehicle provided with a first embodiment of the invention;

Fig. 2 is a fragmentary view of the embodiment illustrated in Fig. 1, taken in the direction of the arrow marked 2;

Fig. 3 is an elevational sectional view of the structure illustrated in Fig. 2, taken along the line 3—3 thereof;

Fig. 4 is an elevational sectional view of the structure illustrated in Fig. 3, taken along the line 4—4 thereof;

Fig. 5 is an elevational view of the structure illustrated in Fig. 1, taken along the line 5—5 thereof;

Fig. 6 is a fragmentary view of the structure illustrated in Fig. 5, taken along the line 6—6 thereof;

Fig. 7 is an elevational sectional view of the structure illustrated in Fig. 1, taken along the line 7—7 thereof;

Fig. 8 is a view of the structure illustrated in Fig. 1, taken along the line 8—8 thereof;

Fig. 9 is a view of the structure illustrated in Fig. 1, taken along the line 9—9 thereof, but with the wheels of the parking device removed;

Fig. 10 is a view of the structure illustrated in Fig. 9, taken along the line 10—10 thereof;

Fig. 11 is a side elevational view of one side of the casing for the parking device;

Fig. 12 is an elevational sectional view of the braking element of the parking device which contacts the left rearward wheel of the vehicle;

Fig. 13 is an elevational sectional view of the structure illustrated in Fig. 12, taken along the line 13—13 thereof;

Fig. 14 is a schematic diagram of the hydraulic system for actuating the fluid cylinders for the parking device;

Fig. 15 shows the retracting position for the control valve for the hydraulic circuit shown in Fig. 14;

Fig. 16 is a second embodiment of a control valve for the hydraulic circuit shown in Fig. 14;

Fig. 17 is a horizontal sectional view of the control valve illustrated in Fig. 16 showing the valve turned to a position for retracting the parking device, taken along the line 17—17 thereof;

Fig. 18 is a horizontal sectional view of the control valve illustrated in Fig. 16 showing the valve turned to a position for actuating the parking device into an operative position, taken along the line 18—18 thereof;

Fig. 19 is a partial rear end elevational view of the right drive wheel, axle and differential of a vehicle provided with a second embodiment of the invention;

Fig. 20 is a fragmentary side elevational view of the parking device illustrated in Fig. 19, taken in the direction of the arrow marked 20;

Fig. 21 is an elevational sectional view of the structure illustrated in Fig. 20, taken in the direction of the line marked 21—21 thereof;

Fig. 22 is an elevational sectional view of the structure illustrated in Fig. 21, taken along the line 22—22 thereof;

Fig. 23 is an end elevational view of a third embodiment of the invention;

Fig. 24 is a horizontal sectional view of the structure illustrated in Fig. 23, taken along the line 24—24 thereof;

Figure 25:
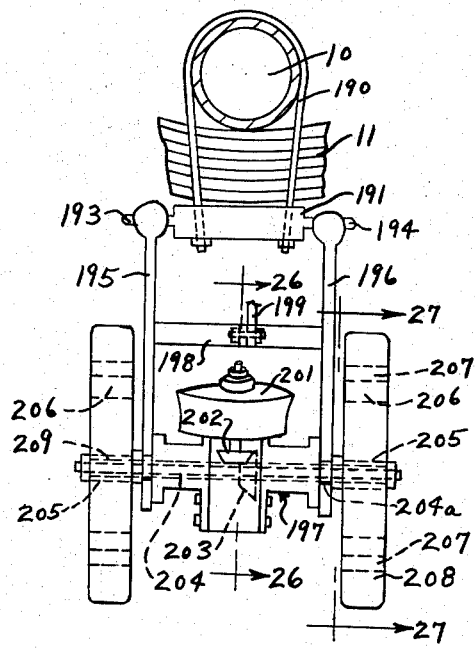
Fig. 25 is an end elevational view of a fourth embodiment of the invention.

In the drawings, the numeral 10 designates the rear drive axle of a vehicle which is driven by a conventional power plant through the usual differential 12. Operatively mounted on the drive axle 10, by the usual means, is the left and right drive wheels 14 and 16, respectively. A power parking device made in accordance with the principles of the invention is generally indicated by the numerals 18 and 20. The power parking device is adapted to raise the rear end of the vehicle from the ground 19 a slight distance, as indicated by the numeral 21, and to move the rearward end of the vehicle in a sideward direction, as indicated by the arrow marked 22 in Fig. 1, against the curve 24.

The power parking device disclosed herein comprises the drive unit 18 and the brake unit 20. The drive and brake units are substantially similar in structure with some differences, as explained more fully hereinafter.

As shown in Figs. 1 through 4, the drive unit 18 comprises a friction wheel 26 which is adapted to be forced into engagement with the inner side of the tire on the wheel 16, and, to be driven by the tire when the wheel 16 is rotated by the engine of the vehicle. The wheel 26 is provided with a solid rubber tire, whereby, a rolling frictional contact at 27 is made with the tire on the wheel 16. The wheel 26 is mounted on the upper end of a shaft 28 with the lower side of the wheel abutting against the shoulder 30 of said shaft. A nut 32 is threadably mounted on the upper end of the shaft 28 and is adapted to abut the upper side of the wheel 26 and lock said wheel against the shoulder 30, whereby, the wheel 26 will be fixedly mounted on the shaft 28. The lower end of the shaft 28 is enlarged, as at 33, and is rotatably mounted in a vertical aperture 34 in the casing 35. The casing 35 is provided with a centrally disposed opening 36 through which the shaft 28 extends. The lower end 37 of the shaft 28 is rotatably mounted in the vertical aperture 38 which communicates with the opening 36. The lower end of the shaft 28 is provided with a hemispherically shaped recess 39 adapted to receive a ball bearing 40. A threaded elongated aperture 41 is provided in the lower side of the casing 35 and is adapted to threadably receive therein the screw 42. The threaded aperture 41 communicates with the aperture 38 in which the lower end of the shaft 28 is rotatably mounted. The upper end of the screw 42 is provided with a hemispherically shaped recess 43 which is adapted to seat the ball bearing 40. The screw 42 is adjustable inwardly and outwardly to regulate the end-play of the shaft 28, and, said screw may be locked in any desired adjusted position, by means of the lock nut 44 which is threadably mounted on the outer end of the screw 42.

Fixedly mounted on the lower end of the shaft 28 is a helicoidal worm gear 45 which is disposed within the opening 36 of the casing 35. The worm gear 45 is fixed on the shaft 28 by means of the set screw 46. The opening 36 in the casing 35 communicates with the second opening 47 in said casing in which is disposed the helicoidal driven gear 48. As is shown in Figs. 3 and 4, the gear 48 is fixedly mounted on a horizontally disposed shaft 49 by any suitable means, as by a press fit, and said shaft extends outwardly from the gear 48 in opposite directions and carries the spaced apart ground engaging wheels 50 and 51.

The casing 35 is open on the sides thereof and said sides are enclosed by a pair of bearing retainer casing portions 52 and 53 which are detachably connected to the casing 35 by any suitable means, as by the screws 54. Operatively mounted between the shaft 49 and the bearing casing portions 52 and 53 are a pair of roller bearings, generally indicated by the numerals 56 and 58. The bearings 56 and 58 abut against the shoulders 59 and 60, respectively, on the shaft 49, and against the shoulder 59a and 60a on the bearing retainer casings 52 and 53, respectively. The bearings 56 and 58 are retained in place against said shoulders by means of the sleeve bearings 61 and 62 on the shaft 49. The wheels 50 and 51 are fixedly mounted on the ends of the shaft 49 in an abutting position with the sleeve bearings 61 and 62. The wheels 50 and 51 may be locked on the shaft 49 by any suitable means, as by means of the lock keys 63 and 64. The ends of the shaft 49 are threaded and adapted to receive the lock nuts 65 and 66, which are threaded inwardly on the ends from the ends of the shaft 49, to hold the wheels 50 and 51 in a fixed axial position.

The outer ends of the bearing casing portions 52 and 53 are suitably enclosed by oil retainer washers, as 67. The casing 35 is provided with an integral upwardly extended lever 68 having a pair of spaced apart integral arms 69 which form a U-shaped structure on the upper end of the lever 68. As shown in Figs. 9 and 10, the vehicle rear axle 10 is provided with a pair of U-shaped hangers 70 for supporting the leaf spring 11 on the vehicle. Fixedly retained on the lower ends of the hangers 70, as by means of the nuts 72, is a pair of spaced apart downwardly extended arms 71, through each of which is formed a horizontal aperture 73. An elongated pin or rod 74 is adapted to be slidably mounted through the apertures 75 and 76 in the lever arms 69 and through the aperture 73 in the arms 71, for supporting the lever 68 from the lower side of the vehicle. The pin 74 may be retained in operative position by any suitable means, as by the split retainer keys 77.

As shown in Figs. 1, 9 and 10, the inner side of the lever 68 is provided with an inwardly extended lug 78 which is provided with an aperture 79 therethrough. The aperture 79 is adapted to receive a pin 80 which carries the U-shaped spaced apart arms 81 and 82 on the lower end of a lever 84. The lever arms 81 and 82 are retained on the pin 80 by any suitable means, as by the lock screw 83. The upper end of the lever 84 is provided with a pair of integral upwardly extended spaced apart arms 85 and 86 through which is suitably mounted an elongated pin 87. As shown in Fig. 8, the pin 87 also passes through an aperture 88 in the outer end of a piston rod 90 which is disposed on said pin between the lever arms 85 and 86. Fixedly mounted on the outer ends of the pin 87, as by means of the lock screw 89, is a pair of spaced apart arms 91 and 92 which are joined by a crossbar 93 of a supporting U-shaped bracket 94. The bracket 94 has a pair of upwardly extended spaced apart arms 95 and 96, the upper ends of which are provided with horizontal apertures therethrough, as 97 and 98. The supporting bracket 94 is pivotally mounted on the drive axle 10 by any suitable means, as by having the apertures 97 and 98 receive the pivot pins 99 and 100, respectively, which may be threadably mounted in the axle 10.

As best seen in Figs. 5 through 7, the piston rod 90 is slidably mounted in a hydraulic cylinder 101 which is provided on the inner end thereof with a pair of spaced apart upwardly extended integral arms 102 and 103 which are provided with horizontal apertures therethrough on the ends thereof, as 104 and 105, respectively. The arms 102 and 103 are pivotally mounted on the pins 106 and 107, which are received in the apertures 104 and 105, respectively. The pins 106 and 107 are threadably mounted, as at 108 and 109, respectively, in the lower end of a supporting ring 110 which is adapted to be adjustably mounted around the rear axle 10. The adjustable supporting ring 110 comprises two half-ring sections 111 and 112 which are provided with the flanges 113 and 114, respectively, on the upper ends thereof. The flanges 113 and 114 are secured together by any suitable means, as by the bolt 115 and the nut 116. The lower end of the half-ring sections 111 and 112 are provided with overlapping abutting portions 117 and 118, respectively, and which are pivotally joined together by means of the bolt 119 and the nut 120.

As best seen in Fig. 7, the inner end of the piston rod 90 has threadably mounted thereon a flange 121 which is adapted to retain a plurality of piston forming elements 122 between which is mounted suitable oil seals 123. The inner end of the cylinder is closed by the integral cylinder head 124, through which is formed a hydraulic oil port 125. The outer end of the cylinder 101 is provided with an integral cylinder end wall 126 through which is formed the aperture 126a for receiving the piston rod 90. An oil seal 127 is provided around the piston rod 90 in the aperture 126a, and is retained in place by means of the cap 127a which is threadably mounted on the outer end of the cylinder 101. The outer end of the cylinder 101 is provided with a hydraulic oil port 128.

As shown in Figs. 12 and 13, the brake unit 20 of the instant power parking device is constructed similarly to the driving unit 18 and, in said figures, the corresponding parts are all marked with similar reference numerals, but which also include the letter "a" to show the parts similar to the driving unit 18. Since the brake unit 20 functions to lift the left rear side of the vehicle and to hold the wheel 14 immovable while the rear wheel 16 drives the drive unit 18, the gears 45 and 48 are removed from the brake unit and the shaft 28a is locked to the casing 35a, by any suitable means, as by means of the lock key 129.

Fig. 14 illustrates a hydraulic system for use with a power parking device of the present invention. The reference numeral 130 indicates a hydraulic oil reservoir which is connected by the conduit 131 with a suitable hydraulic pump 132 which is driven by an electric motor, as 133. The motor 133 is connected by the conductor 134 to an electromagnetic switch 135 which is in turn connected by the conductor 136 to the vehicle battery 137. The ground conductor for the battery 137 is indicated by the reference numeral 138. The hydraulic pump 132 pumps the hydraulic fluid from the reservoir 130 and through the conduit 139 to a hydraulic and air pressure accumulator 140. The accumulator 140 is connected by means of the conduit 141 to a control valve, generally indicated by the numeral 142. A pressure control switch 143 is operatively connected by means of the air pressure spring 145 to the top of the accumulator 140 and by means of the conductor 144, to the electromagnetic switch 135. The conduit 141 is split into two portions, 141a and 141b, which are connected to the entrance ports 142a and 142b, respectively, in the control valve 142. The hydraulic control valve 142 is provided with an exit port 151a, opposite the entrance port 142a, and which exit port is connected to one end of a conduit 151 which is adapted to convey hydraulic fluid to and from the ports 128 and 128a in the hydraulic cylinder 101 and 101a. The other end of the conduit 151 is connected to an entrance port 151b, in the lower end of the control valve 142. An exit port 152a is formed in the lower end of the control valve 142 opposite the entrance port 151b. A conduit 152 is connected to the exit port 152a and to the conduit 149 which is connected to the reservoir 130.

The control valve 142 is provided with an exit port 146a opposite the entrance port 142b and to which is connected the conduit 146 which leads into two conduits, 146b and 146c. The conduit 146b is connected to the ports 125 and 125a in the cylinders 101 and 101a, respectively. The conduit 146c is connected to an entrance port 146d in the control valve 142. An exit port 148a is formed in the control valve 142 opposite the entrance port 146d. The conduit 148 connects the exit port 148a to the conduit 149 leading to the reservoir 130. The control valve 142 is provided with a slidable valve spool 153 on which is formed the enlarged sections 154, 155 and 156 which operate to block the various aforementioned ports, as more fully described hereinafter.

In the practice of the invention, vehicle provided with the power parking device illustrated in Figs. 1 through 15 would first have its front end directed into a parallel parking space leaving the rear end of the vehicle to be moved into the parking space. In order to move the rear end of the vehicle sidewardly into the parking space, the operator would move the valve spool 153 outwardly to the position shown in Fig. 14. With the valve spool moved to the outward position, the enlarged valve spool portions 154 and 156 would function to block the conduit 141 leading from the accumulator to the control valve 142 and to the conduit 151, and, the conduit 146, so as to block the latter conduit from the reservoir 130. Hydraulic fluid would then flow from the accumulator 140 through the conduits 141, 141b and into the port 142b, and out the port 146a and through the conduits 146 and 146b to the ports 125 and 125a in the cylinders 101 and 101a, respectively. The pistons 122 and 122a would then be forced outwardly of their respective cylinders and the piston rods 90 and 90a will be moved outwardly of their respective cylinders. The cylinders will pivot slightly downwardly about their supporting pivot pins and the levers 94 and 68 will also be pivoted downwardly, so as to lower the wheels 50 and 51 into engagement with the ground. Continued movement of the piston rods 90 to their full travel against the cylinder wall 126 will result in the rear vehicle wheels 14 and 16 being raised off the ground a slight distance, as indicated by the numeral 21. During the aforementioned action, the friction wheels 26 and 26a are forced into engagement with the sides of the tires 14 and 16. The rear end of the vehicle may then be moved sidewardly in the direction of the arrow 22, towards the curb 24, by putting the vehicle in low gear and actuating the drive wheels 14 and 16 in the forward direction, that is, by moving the drive wheels in the direction which would normally move the vehicle forwardly. The left rear wheel 14, however, will not move since the wheel 26a is locked relative to its supporting casing 35a. The braking effect of the left unit 20 then permits the right vehicle wheel 16 to exert a drive force on the wheel 26 of the drive unit 18. The wheel 26 conveys the driving force to the shaft 28 which in turn passes such force on through the drive gear 45 to the driven gear 48. Since the gear 48 is fixedly mounted on the shaft 49, said shaft will be rotated and the wheels 50 and 51 will be rotated in a clock-wise direction, as viewed in Fig. 1, and will move the rear end of the vehicle toward the curb 24. Since the wheels 50a and 51a are rotatably mounted in the brake unit 20, said wheels merely serve as means for raising the left rear end of the vehicle and rollably support it while permitting the unit 18 to perform all the driving work for the parking unit. After the vehicle has been moved against the curb 24, it may be lowered by moving the control valve spool 153 to the inward position shown in Fig. 15. In this position, the ports 128 and 128a of the power cylinders 101 and 101a, respectively, will be connected to the accumulator 140, and, the ports 125 and 125a of said cylinders will be connected to the reservoir 130. The pistons 122 and 122a will then be forced inwardly of their respective cylinders and the parking units 18 and 20 will be retracted into their inactive position, as illustrated by the position of the brake unit 20, in Fig. 1. It will be seen that when the parking units are nested in their inoperative position, that the wheels 50 and 51 are disposed on opposite sides of the drive axle 10. The instant power parking device provides a means for easily parking a vehicle in a parallel parking space, and the operation may be accomplished in a minimum of time, and the novel units employed in the invention are adapted to be nested on the underside of the vehicle in a manner whereby they do not present any depending structure from the underside of the vehicle.

The rear end of the vehicle may be moved out of the parking space by raising the vehicle with the parking units and putting the vehicle in reverse, which causes the drive wheel 16 to be reversed in its rotation, and accordingly, the parking unit 18 will be rotated in a counter clock-wise manner, as viewed in Fig. 1. The rear end of the vehicle will, accordingly, be moved outwardly of the curb 24.

It will be understood, that the parking units 18 and 20 may in practice be made to any desired strength and size, in accordance with the weight and size of the vehicle which is to be provided with the invention. Furthermore, suitable electric motors may be substituted for the fluid motors 101 and 101a.

The electromagnetic switch 135 and the pressure switch 143 function to maintain a constant supply of hydraulic fluid under pressure, in the accumulator 140. If the pressure of the air 140a trapped in the upper end of the accumulator 140 drops slightly, the hollow coiled spring 145 will be retracted, permitting the arm 143a to be lowered and the contacts 143b to come together, thereby completing the circuit through the conductors 143c, 144, coil 135a and conductor 136, to the battery 137, and back to ground through conductor 138. The electromagnetic contacts 135b are normally held apart by means of the spring 135c, but when the coil 135a is energized by closing the circuit therethrough, as previously described, contacts 135b will be brought together. When the contacts 135b are brought together, a circuit is completed from the battery 137 to the motor 133 to start said motor and actuate the pump 132, whereby, additional hydraulic fluid will be pumped into the accumulator 140. The aforementioned circuit from the battery to the motor is completed from the ground through the conductor 133a to the motor 133 and through the conductor 134, contacts 135b and the conductor 136 to the battery 137, and back to ground through the conductor 138. When the air pressure in the accumulator has again been increased, due to the fact that additional fluid has been pumped into the accumulator 140, the hollow spring pressure member 145 will be extended, whereby, the arm 143a will be moved upwardly to break the holding circuit through the coil 135a of the electromagnetic switch 135. The aforegoing controls serve to regulate the hydraulic fluid system so as to maintain a constant source of hydraulic fluid under a range of predetermined pressures. It will be obvious, that the illustrative hydraulic supply conduits could be operatively connected to the hydraulic pumps presently used on conventional vehicles for power steering and power brake devices, as desired.

Figs. 16 through 18 illustrate a second control valve embodiment 157 which may be used to control the flow of the hydraulic fluid to the fluid motors 101 and 101a. The numeral 158 designates the tapered valve body to which is integrally connected a handle 159. The valve body 158 has an end portion 158a extending outwardly of the bottom of the valve casing. A washer 162 is mounted around the valve body portion 158a and a spring 163 is mounted between the washer 162 and a cotter key 164 mounted in the valve portion 158a. The valve body 158 has a pair of curved passages 160 and 161 therethrough, which are each adapted to interconnect a pair of the ports 157a, 157b, 157c and 157d. The port 157a would be connected to the conduit 141 leading from the accumulator 140, and the port 157b would be connected to the conduit 146 leading to the head ends of the cylinders 101 and 101a. The port 157c would be connected to the conduit 149 leading to the reservoir 130, and the port 157d would be connected to the conduit 151 leading to the other end of the cylinders 101 and 101a.

When using the control valve 157 in the fluid circuit of Fig. 14, in order to lower the parking units 18 and 20, the valve would be turned to the position as shown in Fig. 18, whereby, hydraulic fluid from the accumulator would flow to the inlet ports 125 and 125a of the fluid cylinders 101 and 101a, respectively. In order to retract the parking units, the valve body 158 would be turned to the position shown in Fig. 17, whereby, hydraulic fluid under pressure would be channelled to the ports 128 and 128a of the cylinders 101 and 101a, respectively.

Figs. 19 through 22 illustrate a second embodiment of the invention in which the drive unit 165 is slightly modified structurally, so as to provide another type of gear drive for the parking unit. In this embodiment, the numeral 167 indicates a casing in which the ground engaging wheels and the tire engaging wheel of the device are mounted. The casing 167 would be suspended from the underside of the vehicle with the same suspension structure as that illustrated in the embodiment of Fig. 1.

The casing 167 has a forwardly and outwardly extended neck portion 169 which has an aperture 170 therethrough communicating with an opening 168 in said casing. Rotatably mounted in the aperture 170 is a shaft 171 which is disposed at an angle from the vertical plane. The upper end of the shaft 171 is reduced, as at 172, and has fixedly mounted thereon, the tire engaging wheel 173. The wheel 173 is held on the shaft 172 by means of the washer 174 and the nut 175. The wheel 173 is covered with a layer of rubber and the outer surface 176 thereof is slightly concave inwardly, so as to be complementary to the curved surface of the tire on the drive wheel 16. The lower end of the shaft 172 has fixedly mounted thereon a bevel gear 177 which meshably engages a bevel wheel gear 178 which is fixedly mounted on the shaft 179.

Fixedly mounted to the sides of the casing 167, is a pair of bearing retainer casing members 180 and 181. The casing members 180 and 181 are fixed to the casing 167 by means of the screws 182. The roller bearings 183 are mounted in said bearing members and operatively support the shaft 179 in the same manner as the embodiment of Fig. 1. The bearings 183 abut shoulders 184 on the shaft 179. Fixedly mounted on each end of the shaft 179 is a ground engaging wheel 186 which is provided with a recess 186a on the inner side thereof for receiving the outwardly extending bearing members 180 and 181. Each of the wheels 186 has an integral inwardly extending sleeve 185 thereon which abuts the adjacent bearing 183 on the shaft 179. The wheels 186 are locked on the shaft 179 by means of lock keys 187, and are held in place axially by means of the lock nuts 188. The outer ends of the bearing casing members 180 and 181 are enclosed by suitable oil seals, as 189.

In use, the embodiment of Figs. 19 through 22 would be used in the same manner as the embodiment of Fig. 1. This embodiment, however, provides for a greater absorption of power from the rear drive wheel 16 of the vehicle, since the curved surface 176 of the contact wheel 173 engages the curved surface of the tire over a greater area, whereby, a better driving contact is provided.

Figure 27:
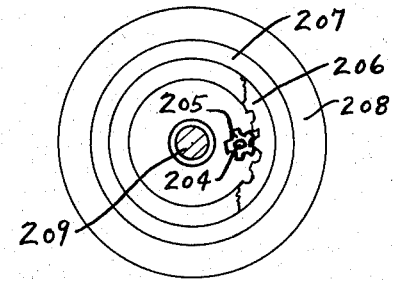
Fig. 27 is an elevational sectional view of the structure illustrated in Fig. 25, taken along the line 27—27 thereof.
Figure 26:
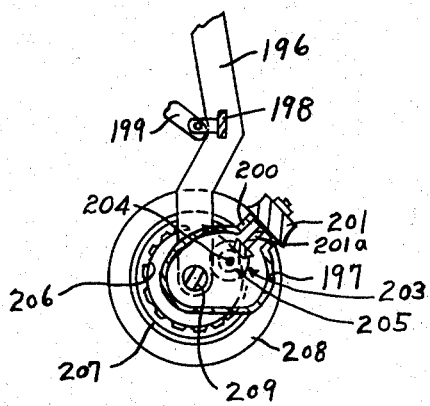
Fig. 26 is an elevational sectional view of the structure illustrated in Fig. 25, taken along the line 26—26 thereof.

Figs. 25 through 27 illustrate a fourth embodiment of the invention, wherein a further type of gear train is provided in the driving unit of the invention. In this embodiment, the numeral 190 indicates the U-shaped hanger for supporting the leaf spring 11 of the vehicle from the rear drive axle 10. Mounted on the lower ends of the hangers 190, in the same manner as that indicated for the embodiment of Fig. 1, is a carrier bar 191 from each end of which extends a bearing pin, as 193 and 194, from which are swingably mounted the depending arms 195 and 196. The arms 195 and 196 carry therebetween a casing 197 in which the drive wheel and supporting wheels and their interconnecting gear train are mounted. The arms 195 and 196 are interconnected by a cross-bar, as at 198, to which is pivotally mounted a lever 199 which is similar to the lever 84 of the embodiment of Fig. 1. The lever 199 would be connected to a hydraulic cylinder similar to 101. As shown in Fig. 26, the casing 197 is provided with an upwardly extended portion 200 through which is rotatably mounted the shaft 201a carrying the tire engaging wheel 201. Fixedly mounted, by any suitable means on the lower end of the shaft 201a, is a bevel gear 202 which meshes with a bevel wheel gear 203 that is fixedly mounted on a horizontally disposed shaft 204. The shaft 204 is supported in suitable bearing means 204a and carries on each end thereof, a fixedly mounted spur drive gear 205. The spur gear 205 meshably engages an internal ring gear 206 which is fixedly mounted inside the wheels 207 carrying the ground engaging rubber tires 208. The wheels 207 are suitably rotatably mounted on the shaft 209 in the casing 197.

In the practice of the invention, the embodiment illustrated in Figs. 25 through 27 would be used in the same manner as the drive unit 18 of the embodiment of Fig. 1.

Figs. 23 and 24 illustrate a third embodiment of the invention, wherein a second type of brake unit is provided for braking a left rear wheel of the vehicle. In this embodiment, the brake unit would be suspended by levers 68, 84 and 94 in the same manner as the drive and brake unit illustrated in the embodiment of Fig. 1. This brake unit would also be actuated from a retracted position to an operating position in the same manner as the brake unit 20 of Fig. 1. As shown in Figs. 23 and 24, a U-shaped carrier, generally indicated by the numeral 210, is fixedly mounted on the lower end of a lever 68, by any suitable means, as by welding. The carrier 210 comprises a horizontal member 211, from each end of which depends an arm, as 212 and 213. The arms 212 and 213 are provided with apertures therethrough, as 214, in each of which is suitably mounted a roller bearing means 215. A shaft 216 is rollably mounted through the bearings 215. A ground engaging wheel, as 217, is fixedly mounted on each end of the shaft 216, by any suitable means, as by the lock keys 218. The wheels 217 may be axially fixed in position by means of the washers 219 and the nuts 220, which are threadably mounted on the ends of the shaft. The nuts may be locked in place by any suitable means, as by means of the split keys 221. Fixedly mounted on the forward side of the vertically disposed U-shaped carrier 210, is a horizontally disposed U-shaped frame, generally indicated by the numeral 222. The frame 222 comprises the spaced apart outwardly extended arms 223 and 224, the inner ends of which are fixedly mounted to the carrier 210 by any suitable means, as by welding. The outer ends of the arms 223 and 224 are joined by a cross-piece 225. The cross-piece 225 extends above and below the upper and lower edges of the arms 223 and 224, respectively. Fixedly mounted on the outer face of the cross-piece 225, is a tire engaging member 226 which is preferably formed from a resilient material, as rubber or the like. As shown in Fig. 23, the member 226 is provided with upper and lower longitudinally extending lips 227 and 228 on the inner side thereof, which extend over the upper and lower edges, respectively, of the cross-piece 225, whereby, a groove and tongue connection is provided between the parts 225 and 226. The member 226 may be further secured onto the cross-piece by retaining screws, as 229 which may be recessed, as indicated by the numeral 230, so as not to scuff the side of the tire when engaged by the member 226. The front tire engaging face of the member 226 may be formed with a concave surface, as indicated by the numeral 231, so as to conform to the curved side surface of a tire.

In the practice of the invention, wherein the brake unit of Figs. 23 and 24 is used, said unit would be nested up against the drive axle 10 with the wheels 217 disposed on the opposite sides of the drive shaft. This brake unit would be lowered into an operative position by means of a hydraulic cylinder, in the same manner as the drive unit 20 of the embodiment of Fig. 1. The tire engaging member 226 would abut the side of the left rear tire 14 and hold it immovable in the same manner as the brake unit of Fig. 1.

It will be understood, that the hydraulic control valve and cylinders 101 may be connected to the fluid reservoir and accumulator of a hydraulic system now used on vehicles for power steering and power brakes, by merely connecting the conduits 149 and 141, respectively, thereto. This procedure would cut down on the overall expense for installing the invention on a vehicle already provided with power steering and power brakes.

It will be understood, that instead of using the brake unit 20, that two drive units as 18 could be used together to provide a power parking unit for use in cases when additional power is desired over what is supplied by one drive unit operating alone. Also, it will be obvious, that the bracket 94 could be pivotally mounted on a supporting bracket as the bracket 110, if desired, with the bracket being smaller to fit the rear axle at the point of suspension of the member 94.

It will be seen that, the present invention provides a power parking device for a vehicle which may be easily and quickly attached to the rear axle of the vehicle and be nested in an out of the way position beneath the rear axle when not in use, and, be moved quickly into an operative position by means of a hydraulic motor which may be powered from the hydraulic system used on present type power steering and power brake units. The power parking device of the present invention is adapted to engage the inner surface of the rear wheels of the vehicle, whereby, a friction wheel on the parking device is actuated which, in turn, powers an enclosed gear train leading to a pair of supporting wheels on the parking unit.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A power parking device in an automotive vehicle having a chassis including rear drive wheels with tires, comprising: a drive unit and a brake unit; each of said units including a casing in which is rotatably mounted a horizontal shaft; a pair of spaced apart ground engageable wheels rotatably carried by said casings; each pair of wheels being fixed on the shaft in their respective casing; a pair of first levers fixedly connected at their lower ends to each of the casings of the units and having the upper ends pivotally connected to the chassis adjacent the drive wheels of the vehicle; a pair of brackets spaced inwardly from said first pair of levers and having the upper end hingedly mounted on the chassis; a pair of second levers; each of said second levers having its upper end hingedly connected to one of said brackets and the lower end hingedly connected to the adjacent unit casing; a pair of hydraulic cylinders spaced inwardly of said second levers and having a piston rod extendable therefrom from one end thereof; each of the piston rods being hingedly connected to the upper end of one of said pair of second levers; the other end of each of said hydraulic cylinders being hingedly connected to the chassis; a gear fixedly mounted on the horizontal shaft in said drive unit; a second shaft rotatably mounted in the casing of said drive unit and carrying a drive gear meshably engaging the gear on said horizontal shaft; a friction wheel fixed on said second shaft and adapted to engage the side of a tire on one of the vehicle drive wheels for a friction drivable engagement therewith when the drive unit is in a lowered ground-engaging position; a friction member fixedly mounted on said brake unit and adapted to engage the side of a tire on the other of the vehicle drive wheels for braking operation when the brake unit is in a lowered ground-engaging position; a fluid system for providing fluid under pressure to said hydraulic cylinders for selective raising and lowering of said units from the operative and inoperative positions; said fluid system including, a fluid reservoir for receiving fluid from said hydraulic cylinders, a fluid accumulator, a pump operatively connected to said reservoir for pumping fluid into the fluid accumulator, a pressure operated switch means for starting and stopping said pump for maintaining a desired pressure in said fluid accumulator; and, a manually operated flow control valve for directing the fluid under pressure from said accumulator to the desired ends of said hydraulic cylinders and back to said reservoir.

2. In a power parking device for an automative vehicle, a drive unit comprising: a casing; a horizontal shaft rotatably mounted in said casing; a pair of spaced apart ground engageable wheels fixedly mounted on said horizontal shaft; a driven gear fixedly mounted on said horizontal shaft; a second shaft rotatably mounted in said casing; a drive gear fixedly mounted on said second shaft; a friction wheel fixedly mounted on said second shaft and adapted to engage the tire of a vehicle drive wheel when the drive unit is in a ground-engaging operative position; means for swingably suspending said drive unit from the vehicle; power means for swinging said drive unit from a raised inoperative position to a lowered operative position; said means for swingably suspending said drive unit comprising, a first lever having the lower end fixedly connected to the drive unit and the upper end hingedly connected to the vehicle, a bracket having the upper end thereof hingedly connected to the vehicle at a point inwardly of said first lever, a second lever having the upper end thereof hingedly connected to the lower end of said bracket and the lower end thereof hingedly connected to the first lever; said power means including a hydraulic cylinder having one end hingedly connected to the vehicle and a piston rod extending from the other end of said hydraulic cylinder and being hingedly connected to the upper end of said second lever; a fluid system connected to said power means including, a fluid reservoir for receiving fluid from the hydraulic cylinder, a fluid accumulator, a pump operatively connected to said reservoir for pumping fluid into the fluid accumulator, a pressure operated switch means for starting and stopping said pump for maintaining a desired pressure in said fluid accumulator, and, a manually operated flow control valve for directing the fluid under pressure from said accumulator to the desired ends of said hydraulic cylinder and back to said reservoir.

References Cited in the file of this patent

UNITED STATES PATENTS

| | | |
|---|---|---|
| 1,513,282 | Sheets | Oct. 28, 1924 |
| 1,857,611 | Swift | May 10, 1932 |
| 1,896,118 | Wellensiek | Feb. 7, 1933 |
| 2,165,461 | Dreisbach | July 11, 1939 |
| 2,364,553 | Rische | Dec. 5, 1944 |
| 2,746,554 | Matthews | May 22, 1956 |
| 2,751,989 | Dreisbach | June 26, 1956 |